United States Patent
Hosoe et al.

(10) Patent No.: US 7,383,697 B2
(45) Date of Patent: Jun. 10, 2008

(54) OPTICAL ELEMENT MOLDING METHOD

(75) Inventors: Shigeru Hosoe, Hachioji (JP); Hiroshi Nagoya, Hachioji (JP)

(73) Assignee: Konica Minolta Opto, Inc. (JP)

( * ) Notice: Subject to any disclaimer, the term of this patent is extended or adjusted under 35 U.S.C. 154(b) by 276 days.

(21) Appl. No.: 11/130,936

(22) Filed: May 16, 2005

(65) Prior Publication Data

US 2005/0268660 A1   Dec. 8, 2005

(30) Foreign Application Priority Data

May 20, 2004   (JP)   ............................ 2004-149918

(51) Int. Cl.
C03B 23/00   (2006.01)
(52) U.S. Cl. ........................................................ 65/102
(58) Field of Classification Search .................. 65/102, 65/63, 269
See application file for complete search history.

(56) References Cited

U.S. PATENT DOCUMENTS 5,228,894 A * 7/1993 Sato et al. ..................... 65/102
5,987,922 A * 11/1999 Hirota et al. ................... 65/64
6,354,111 B1 * 3/2002 Ota et al. ................. 65/374.11
6,766,661 B2 * 7/2004 Sawada et al. ............... 65/102
7,140,205 B2 * 11/2006 Fujiwara et al. ............... 65/64
2002/0053222 A1 * 5/2002 Sawada et al. ................. 65/85

FOREIGN PATENT DOCUMENTS

JP     4-16414      3/1992
JP     07-267658   * 10/1995

* cited by examiner

Primary Examiner—Eric Hug
Assistant Examiner—DeMaris R. Wilson
(74) Attorney, Agent, or Firm—Cantor Colburn LLP

(57) ABSTRACT

A method for molding an optical element by pressing a glass material in a mold, the method having the steps of: heating to soften the glass material outside a cavity of the mold; heating the mold; and pressing the glass material with the mold after putting the glass material into the cavity of the mold, wherein when the glass material is put into the mold a temperature of the glass material is in a range of $(Tg \times 1.60)$ to $(Tg \times 1.85)°$ C., and a temperature at an optical transfer surface of the mold is in a range of $(Tg+50)$ to $(Tg-70)°$ C., where Tg is the glass-transition temperature of the material.

19 Claims, 9 Drawing Sheets

PRESSING FORCE

OPTICAL ELEMENT MOLDING METHOD

This application is based on Japanese Patent Application No. 2004-149918 filed on May 20, 2004 in Japanese Patent Office, the entire content of which is hereby incorporated by reference.

BACKGROUND OF THE INVENTION

1. Technical Field

This invention relates to a method of molding glass materials into optical elements and optical elements molded by the method.

2. Background of the Art

When heated up to a temperature about twice as high as the glass-transition temperature (Tg), glass materials for forming optical elements melt and become fluid to drip by gravity. For example, an optical glass material of a glass-transition temperature (Tg) of 500° C. can melt and drip through a nozzle when heated at 1000° C. or higher (which is twice as high as the glass-transition temperature). In this melting temperature range, glass can change its form freely. By putting a glass material in a mold for an optical element, we can transfer a mold shape approximately exactly to the glass material. For example, Patent Document 1 discloses such a droplet molding method of forming glass droplets for optical elements.

Patent Document 1: Japanese Examined Patent Publication H04-16414

However, in the droplet molding method of Patent Document 1, the molds may be exhausted quickly since the high-precision and smooth optical transfer surface of the mold is frequently in touch with extremely hot molten glass, easily coupled with oxygen in the air, and deteriorated. The optical surface of a mold made of, for example, cemented carbide material will be rough by some thousand molding shots and have to be replaced by a new one. Consequently, we must stop the molding machine for die change and set up the new mold. This takes a lot of time, cuts the operating ratio of the machine greatly and as the result reduces the productivity of the molding machine. Further, the cemented carbide mold materials are extremely hard and it takes a lot of time and trouble to machine the high-precision optical transfer surface of the mold. Therefore, it is difficult to say that the droplet molding method (which will easily deteriorate the high-cost molds) is fit for mass production of low-cost glass optical elements.

A re-heating molding method has been proposed and in practical use which comprises the steps of putting a glass piece of room temperature in the cavity of a mold, heating the mold and the glass piece together, press-molding the molten glass in the mold, cooling the mold and the glass piece together after the press-molding is completed, and taking out the shaped glass optical elements after the glass becomes fully hardened. This method has problems of occupying the mold which has a greater heat capacity than the glass piece during both heating and cooling the glass piece, keeping the mold at a constant heating rate to heat the glass piece of bad heat conductance uniformly, and having a longer molding tact because of low thermal coefficient and utilization efficiency. Therefore this method is not adequate to mass production of glass optical elements.

To solve these problems, the conventional reheating molding methods have contrived to shape a plurality of optical elements at a time (multiple-molding) or to prepare a lot of molds and pass them through a heating furnace, a pressing furnace, and a cooling furnace in the order continuously. Since these methods, however, heat the glass pieces and the molds together from the outside, the molds become basically hotter than the glass pieces in the molds, the molten glass sticks to the optical transfer surface of the mold. This reduces the operating rate and reliability of the molding machine. Also in the above method that passes molds through furnaces, it is very difficult to assure both a high reliability of molds and high-precision molding of glass optical elements since placing a pair of molding parts having opposite optical transfer surfaces without eccentricity is inconsistent with accomplishing a high tolerance in fitting of parts to slide the molds smoothly for pressing.

It appears to be a reality that there has been no better molding method which can reduce the mold occupying time and molding time and produce high-precision glass optical elements at high reliability and yields than these conventional molding methods.

SUMMARY OF THE INVENTION

An embodiment of this invention is to solve the above problems of the conventional molding methods and more particularly to provide an optical element molding method that can shorten the molding tact and produce high precision glass optical elements at high reliability and yield.

An object of this invention is to solve the above problems of the conventional molding methods and more particularly to provide an optical element molding method that can shorten the molding tact and produce high precision glass optical elements at high reliability and yield.

An optical element molding method to accomplish at least one of the above embodiments of this invention is a method of press-molding a glass material into optical elements by molds. This method is characterized by including a process of heating and softening a glass material outside the cavity of a mold, a process of heating said mold, and a process of putting the glass material into the cavity of said mold and pressing the glass material by said mold, wherein the temperature of the glass material to be put in the mold is in the range of Tg*1.60 to Tg*1.85° C. (where Tg is the glass-transition temperature of the material), and the temperature at an optical transfer surface of the mold is in the range of Tg+50 to Tg−70° C. when the glass material is put in the mold.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
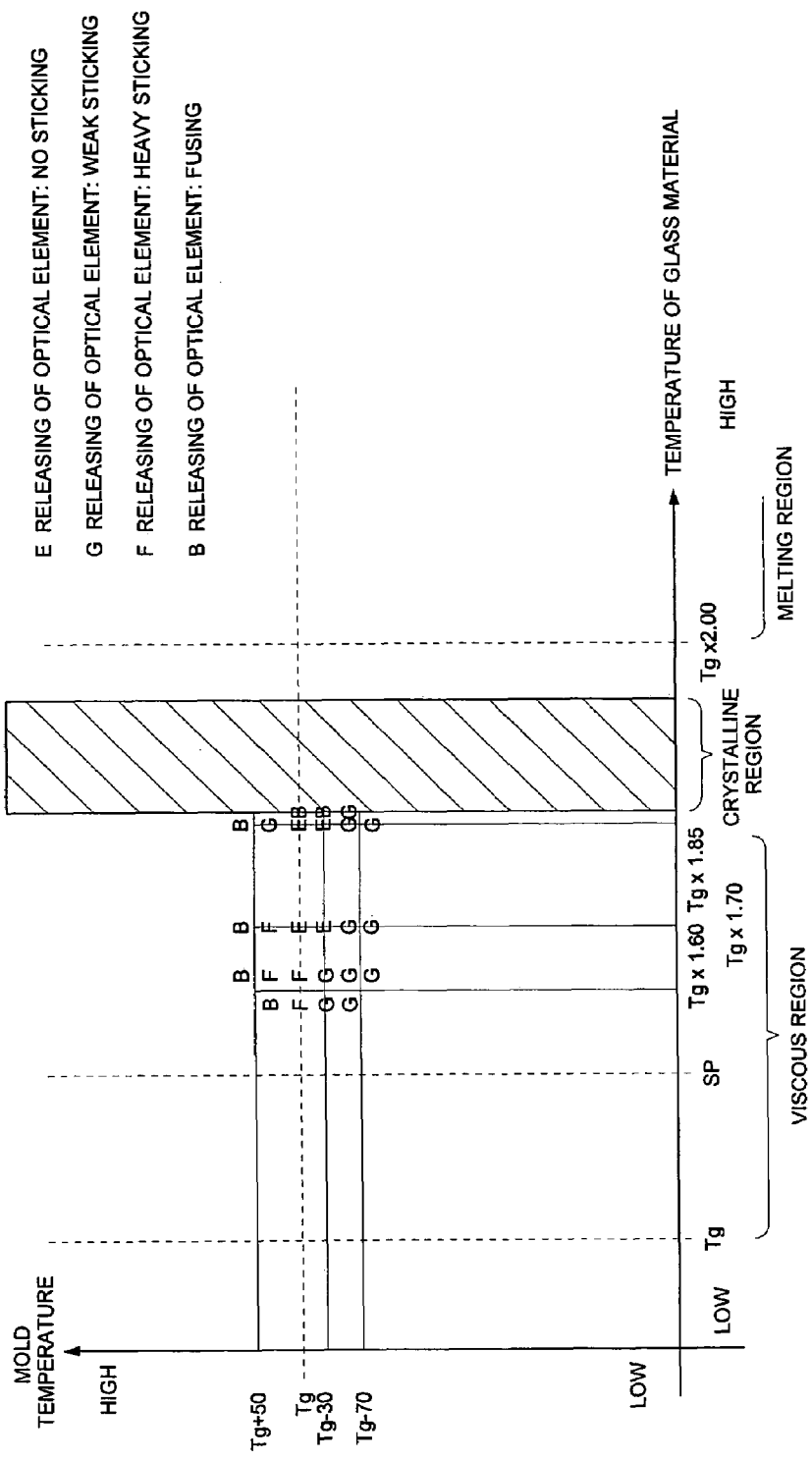
FIG. 1 is a graph showing the relationship between the molding temperature of the molding method of this invention and the molding temperature of the conventional molding method.

The above problems can be solved by the embodiments of this invention below.

(1) An optical element molding method of press-molding a glass material into optical elements by a mold, comprising:

a process of heating and softening a glass material outside the cavity of a mold, a process of heating said mold, and a process of putting the glass material into the cavity of said mold and pressing the glass material by said mold, wherein the temperature of the glass material to be put in the mold is in the range of Tg*1.60 to Tg*1.85° C. (where Tg is the glass-transition temperature of the material), and the temperature of the mold is in the range of Tg+50 to Tg−70° C. when the glass material is put in the mold.

The viscosity of molten glass is 10 pois in a temperature range of Tg by 1.85 to 1.95° C. (where Tg is the glass-transition temperature of the material) which is a little lower than the temperature range of the melting region of the above-said glass material for optical elements. This region is called a crystalline region. In this region, the glass is very unstable and part of its components starts to crystallize. This crystallization generates clouds, fine crystalline dusts, and component gas bubbles in the molten glass and further it changes the composition of the glass and consequently changes the refractive index of the glass. These problems are fatal enemies to optical elements. Therefore, it is very important not to keep the glass material long in this temperature region to assure the quality of optical element glass. These problems are fatal enemies to optical elements. Therefore, it is very important not to stay the glass material long in this temperature region to assure the quality of optical element glass.

Although the temperature of the glass material is higher than its glass-transition temperature (Tg) to soften and mold the optical element glass, it is necessary that the temperature is lower than the melting temperature of the glass to extend the service life of the mold and further lower than the temperature range of the crystalline region to stabilize the glass composition. This is the minimum requirements of molding high-precision glass optical elements at high efficiency. We inventors found that the high limit of the glass material is Tg by 1.85° C. or lower (where Tg is the glass-transition temperature of the glass material) independently of the kinds of the glass material.

Meanwhile, the heated and molten glass is pressed by the mold to form glass optical elements. Therefore, the glass is strongly pressed against the optical transfer surface of the mold and part of the glass may be bonded and remain there. Consequently, the resulting optical transfer surface of the glass optical element may have spot-like defects there. This is a problem pertaining to the mold-releasing of optical elements. It is very difficult to suppress generation of this adhesion of glass to the optical transfer surface of the mold completely during so many molding shots. It has been known as a great problem to be solved in the prior art of press-molding of glass optical elements. Conventionally, the user of the molding machine must remove the mold periodically at every predetermined number of molding shots, clean off left-over glass from the optical transfer surface of the mold by hydrogen fluoride (HF) or hydrogen peroxide solution ($H_2O_2$) which is harmful and dangerous to human bodies, remount the mold on the molding machine, and restart molding. This cleaning work (removing, cleaning, and remounting the mold) breaks the molding process and cut the operating ratio of the molding machine extremely. Further, to continue production by molding even during this cleaning work, the user must provide two or more substitute molds. This increases the mold cost.

There may be two ways to prevent the molten glass from sticking to the counterpart (the mold here) in contact, that is, from getting wet to the counterpart material in contact. One is to make the counterpart material less wettable and another is to make the counterpart material cooler than the glass material. These ways can be used singly but preferably be used together. The former way will not be explained in detail here because many applications have been made to propose materials which are hard to be wet to glass materials as materials to coat the optical transfer surface of molds. The latter way works to quickly cool, shrink, and harden the hot glass material when it touches the cooler mold. In this case, the surface of the glass material that touches the mold surface moves along the mold surface and the surface of the mold is not wet to the glass material. As you know, when you drop molten solder on a copper foil at room temperature, it turns into small balls and rolls around. However, when you drop molten solder on a heated copper foil, it is wet to the hot foil and spreads wide on the foil. Therefore, we can prevent the glass material from sticking to the optical transfer surface of the mold by cooling down the mold to a low temperature at which the surface of the glass material may be cooled, shrunk, and moved when it touches the mold surface. We inventors studied and researched hard to know the temperature of the optical transfer surface of the mold at which the glass material of Tg by 1.85° C. or lower will not stick to the mold surface. The conclusion we got is as follows:

When the optical transfer surface of a mold is hotter by 50° C. than the glass-transition temperature (Tg) of a glass material, 1) the glass material almost always sticks to the optical transfer surface of the mold, and its hard to prevent this, 2) if the glass material is press-molded immediately after the above, the glass material is hardened insufficiently and its surface is unstable. As the result, the transferability of the optical surface is not good.

Contrarily, when the optical transfer surface of a mold is cooler by 70° C. or more than the glass-transition temperature (Tg) of a glass material, 1) the glass material never sticks to the optical transfer surface of the mold, but the glass material rapidly hardens and becomes viscous during press-molding and the glass material will not be pressed to a preset press-stroke. This results in insufficient pressing and reduces the transferability of the optical surface extremely. We tried to forcibly push highly-viscous glass into the mold at up to 100 N/mm$^2$, but the optical surface of the molded glass had cracks which radiated in all directions. Naturally, this optical element was not acceptable as a product.

We, the inventors of the present invention, found that the above observation and information are recognized almost independently of the volume of the molded optical element.

This is because the heated molten glass is cooled almost by the mold instead of the air, the heat of the glass is discharged only by the mold. And when the contact area between the glass material and the mold surface increases as the press-molding advances, the surface temperature of the glass material falls rapidly and its viscosity goes up fast as the thermal conductivity of the glass material is extremely low. However, this temperature gradient is steep and the viscosity of the glass material quickly goes lower as you go into the glass material. As the result, a hard rubber-like viscous skin layer is formed on the surface of the glass material because of a difference in viscosity between the surface and the inside of the glass material.

As the adhesion of the glass material to the mold surface and insufficient contact of the glass material to the mold by pressing, and other phenomena take place on the interface between the mold and the skin layer, it is assumed that such phenomena are almost independent of the volume of the glass material under the skin layer. Further, the transferability is almost determined by the thickness of the skin layer (that is, immediately after the glass material touches the optical transfer surface of the mold or when the skin layer is very thin), the degree of contact of the glass material to the optical transfer surface of the mold, the degree of contact of the glass material at which the glass material hardens, and how long the glass material is kept during hardening process.

From the foregoing, we found that the temperature of the optical transfer surface of the mold should be in the range of Tg+50 to Tg−70° C. (where Tg is a glass transition temperature of the glass material) when the temperature of the glass material is Tg by 1.85° C. or lower before the glass material is put in the mold to surely produce high-precision glass optical elements, and to prevent the glass material from sticking to the mold.

In the above description, we found the effect of setting the temperature of the glass material under Tg by 1.85° C. However, we must determine a lower temperature limit which enables adequate molding. We inventors found we could determine it from the temperature of the mold and the pressing time. In other words, by setting the mold temperature a little higher, we can reduce the difference in temperature between the glass material and the mold and can reduce the rate of cooling and hardening of the glass material when the glass material touches the mold. With this, we can set the temperature of the glass material lower.

Further, by quick press-molding or by shortening the pressing time, we can complete the press-molding before the glass material hardens. Therefore, we can set the temperature of the glass material lower. Contrarily, when the press-molding is made slower, the press-molding time is extended. In this case, unless the temperature of the glass material is made higher, the glass material is cooled and hardened before the press-molding is complete. In other words, the press-molding of the glass material cannot be complete before the preset press stroke comes.

Therefore, it is apparent that the temperature of the glass material becomes lowest when the temperature of the mold is Tg+50° C. (which is the highest in the above temperature range) and when the pressing time is made as short as possible. We actually molded glass optical elements and examined the lowest glass temperature condition. We found that press-molding is enabled to Tg×1.60° C. and the press-molding time between the start of pressing and the reach to the preset stroke is 5 seconds which is extremely short. In this experiment, the optical element had biconcave surfaces. The dimensional precision of the optical surfaces of the element is by no means inferior to that of the optical surfaces made under the other molding condition having longer press-molding time.

Specifically, we found that, by setting the temperature of the glass material in the range of Tg×1.60 to Tg×1.85° C. (where Tg is the glass-transition temperature of the glass material and the temperature of the optical transfer surface of the mold in the range of Tg+50 to Tg−70° C., high-precision glass optical elements can be molded very fast with suppressing the sticking of the glass material to the mold surface. It is more preferable that the temperature of the glass material is in the range of Tg×1.70 to Tg×1.85° C. (where Tg is the glass-transition temperature of the glass material before it is put in the mold and the temperature of the optical transfer surface of the mold is in the range of Tg to Tg−30° C.

(2) The optical element molding method of (1), wherein the press-molding starts within 3 seconds after the heated and molten glass material is put in the cavity of the mold This molding method comprises the steps of putting heated and molten glass material into a mold which cooler than the glass material, cooling and hardening the glass material while press-molding is in progress, and thus forming a high-precision optical element at high speed and stability. However, as described above, cooling and hardening of the glass material starts immediately when the glass material is put in the mold. Therefore, it is very important to start pressing immediately when the glass material is put in the mold. In a conventional droplet molding method, pressing starts after the glass droplet is put in the mold and cooled for about 5 seconds to fully grow thickness of the skin layer. Otherwise, the contaminated optical transfer surface of the mold may be directly transferred to the surface of the optical element by the pressing force. Therefore, the molding time of the conventional molding method is about 20 seconds and the molding tact time cannot be 15 seconds or shorter.

Contrarily in the molding method of this invention, it is preferable to start pressing the glass material immediately while the viscosity of the glass material is low after the glass material is put in the mold because this method transfers the shape and roughness of the optical surface of the mold faithfully to the surface of the glass material. Further, since the temperature of the glass material in the molding method of this invention is fairly lower than its melting temperature, the surface of the glass material starts to harden immediately when it touches the mold and is solidified in about 5 seconds. So to complete press-molding without fail, it is preferable to start pressing within at least 3 seconds after putting the heated and molten glass in the mold. "Start pressing" means starting to press the glass material in the cavity of the mold by the molding machine.

(3) The optical element molding method of (1), wherein the mold has one pair of mold members to press the glass material and the pressing time between the start pressing and the reach to a preset stroke is 15 seconds or less.

When the pressing time is 15 seconds or less, the molding method of this invention can produce high-precision glass optical elements stably.

(4) The optical element molding method of any of (1) to (3), wherein the pressing force is controlled so that the mean pressing force of the mold becomes 80 N/mm² at least 3 seconds later after the pressing starts.

To prevent cracks in the optical surface of the molded optical element, it is preferable to set the mean pressing force (pressing force divided by the lens area) to 80 N/mm² or less in the latter part of the pressing process in which the viscosity of the cooled and molten glass becomes high rapidly. This mean pressing force of 80 N/mm² or less suppresses hardening of the glass with a compression stress held inside the glass. If left in the glass, the compression stress tries to expand in the glass and give a tensile stress to the surface of the glass when the molded optical element is taken out from the mold. This is the cause of cracks in the glass surface. If the compression stress is extreme, the molded optical element may suddenly burst into pieces.

(5) The optical element molding method of (4), wherein the pressing force is controlled so that the mean pressing force of the mold becomes 10 N/mm² or more at the end of the pressing process.

To transferring the high-precision optical transfer surface of the mold exactly to the glass surface, it is preferable to hold the mean pressing force of at least 10 N/mm² at the end of the pressing process and make the glass surface closely appressed against the optical transfer surface of the mold. If the mean pressing force is weaker at the end of the pressing process, the glass is not in close contact with the mold and is still viscous to flow a little just before the end of the pressing process. Consequently, deformation due to shrinkage takes place partially in the glass and the shape of the optical transfer surface is not transferred to the surface of the glass exactly. This phenomenon is called a surface sink. The molding method of this invention can suppress the surface sinks by holding the mean pressing force of at least 10 N/mm².

(6) The optical element molding method of any of (1) to (5), wherein the pressing force is controlled so that the mean pressing force of the mold becomes temporarily 50 to 250 N/mm² in a time period of 3 seconds after pressing starts.

When a high pressing force is applied in the beginning of the pressing process at which the glass material is hot and low in viscosity, the glass is momentarily appressed against the optical transfer surface of the mold without producing any crack in the glass. This can increase the mold transferability. Further, in this case, the whole surface of the glass material is made in close contact with the optical transfer surface of the mold and the glass material can be cooled and hardened more quickly. Therefore, we can save the molding time when it has the same mold transferability. However, if the glass is hardened quickly, the compression stress may be left inside the glass and cause cracks on the glass surface. Therefore, it is preferably within 3 seconds after pressing starts that the high-pressure of 50 to 250 N/mm² is applied.

(7) The optical element molding method of any of (1) to (6), wherein the mean pressing force of the mold is controlled temporarily to the maximum pressing force in the period of 3 seconds after pressing starts and then down to lower pressures continuously or intermittently as the pressing advance.

By giving a maximum mean pressing force to the glass material at an optimum timing in a time period of 3 seconds after pressing starts, we can give a great pressing deformation to the glass material in the beginning of the pressing process at which the glass material is hot and low in viscosity. With this, we can make the glass appressed against the optical transfer surface of the mold without producing any crack and double refraction in the glass, increase the transferability. The lower mean pressing force that follows the maximum mean pressing force suppresses generation of cracks and increase of the internal stress when the glass is hardened and becomes viscous. Consequently, we can accomplish safe and high-transferable press-molding. The lower pressing forces can be applied continuously or intermittently.

(8) The optical element molding method of any of (1) to (7), wherein a molding chamber is provided to shield the atmosphere to which the glass material and the mold cavity contact, and the pressure in the molding chamber is reduced below the atmospheric pressure during the pressing process.

The molding method of this invention can mold glass optical elements at high-precision and speed. For example, if an optical element to be molded has a convex optical surface, a molding gas such as air or nitrogen gas may remain as a gas pool between the glass material and the mold cavity in a fast pressing. This gas pool strikingly reduces the transferability of the optical surface. The chamber is provided to eliminate such gas pools. In other words, the chamber evacuates gas around the glass material and the mold cavity before the pressing starts and also suppresses such gas pools even in a quick molding whose pressing time is short. This can assure high transferability of the optical transfer surfaces.

Since this method makes the glass material appressed against the optical transfer surface of the mold, this method can improve the mold transferability even when gas pools are not formed. Therefore, the molded high-precision optical elements are even in performance and their yield can be held high.

Recently, various kinds of optical elements have been put to practical use and mass-produced. For example, an optical element having ring-like diffraction grooves (diffraction bracelets) is used in the optical recording field because it corrects chromatic aberrations efficiently. Raw materials of such optical elements are plastic and glass materials. Crystalline materials such as zinc selenide (ZnSe) are often used for infrared optical systems. These optical elements can be mass-produced efficiently by molding. However, there are some important subjects to be solved in molding of optical elements, for example, how an optical element mold can have fine diffraction grooves on its optical surface at high precision and efficiency.

Additionally, there have been made many approaches to give a fine structure of up to several times of a light wavelength in use to an optical surface and add a new optical function to the optical element. For example, a single-lens optical lens can have an achromatic function that usually cannot be accomplished singly by diffraction, by using the normal light collecting function due to diffraction of a molded lens and a function to cancel a positive dispersion which generates as a side effect of the light collecting function by a great negative dispersion due to diffraction which is obtained by forming diffraction grooves on the an aspheric surface of the element. This has been put to practical use for pickup object lenses for DVD/CD compatible optical disks. This function uses a diffraction effect of diffraction grooves which are ten times as long as the wavelength of light that passes through the optical element. The region which handles the diffraction effect due to a structure, which is fully greater than the wavelength, is called a "scalar region."

Meanwhile, it has been well known that an optical element can have a reflex inhibition function by densely forming conical projections on the optical surface at a fine interval of a fraction of the wavelength of light passing through the optical element. In other words, the light reflection can be inhibited by changing the refraction index in the interface between the air and the optical surface gradually by a matrix of conical projections disposed at a fine interval instead of changing the refraction index in a moment from 1 to the refraction index of the medium when a light wave enters the optical element. The optical surface having such a fine projection structure called a moth eye provides a mean refraction index for a light wave because a set of fine structures each of which is smaller than the wavelength of a light wave and disposed at an interval shorter than the wavelength of a light works as a whole. In this case, it is assumed that the structures do not refract individually. This kind of region is generally called an equivalent refraction index region. Such an equivalent refraction index region is described in detail in Report of Institute of Electronics, Information and Communication Engineers Vol. J83-C No. 3, pp. 173-pp. 181 (March 2000).

The fine structure of the equivalent refraction index region can produce a great reflex inhibition effect which is less angular- and wavelength-dependent than that of the conventional reflex inhibition coat. Its optical surfaces and fine structure can be formed at the same time on an optical element by plastic molding or the like. Specifically, when plastic-molded, the optical element can have the lens function and the reflex inhibition function at the same time and requires no conventional post-processing such as reflex inhibition coating after molding. From the above production merits, this technique has drawn people's attention. Further, it is possible to give a strong optical anisotropy to an optical surface by disposing the fine structure of the equivalent refraction index region at a preset angle to the optical surface. Further, it is possible to mold double-reflex optical elements which have been made by cutting out crystals such as crystalline quartz conventionally. Furthermore, it is possible to add a new optical function to the optical element by combining it with a refraction or reflection optical element. In this case, its optical anisotropy is called a structural double refraction.

Between the above described scalar region and the equivalent refraction index region, there is a resonance region which dramatically changes the diffraction efficiency by a little difference in incident conditions. For example, when we keep on narrowing the groove width of diffraction bracelets, we will find a phenomenon (anomaly) that drastically moves down and up the diffraction efficiency at a groove width which is equal to about several times of the wavelength. Using the nature of this region, we can create, by a fine structure, a waveguide mode resonance lattice filter which reflects a specific wavelength only. This filter has the same effect as the normal interference filter but is less angular-dependent.

To create optical elements using the scalar region, the equivalent refraction index region, and the resonance region, we must form fine projections (or dents which are generically called fine structures) on their optical surfaces. However, by conventional molding methods, it is difficult to transfer such fine dent/projection structures from the optical transfer surface of a mold, even when such micro structures are formed on the mold surface, to the optical surface of an optical glass material.

This is because of a gas (air or nitrogen gas) left in the micro dents on the optical transfer surface of the mold. When a glass material is molded into an optical element having fine structures such as diffraction grooves on its optical surface, the gas prevents the glass material from entering the micro dents on the optical transfer surface of the mold. Consequently, the ability to transfer fine structure drops drastically.

Contrarily, the molding method of this invention can dissolve the above problem by reducing the pressure in the molding space (to evacuate). In other words, this pressure reduction removes the molding gas (air or nitrogen gas) from micro dents on the optical transfer surface of the mold, enables transfer-molding of glass diffraction optical elements and other optical elements having optical surfaces with reflex inhibition structures without glass sticking to the mold surface, and consequently assures high-precision and fast molding of optical elements.

(9) The optical element molding method of (8), wherein the pressure of the molding chamber is reduced below the atmospheric pressure before the pressing process by a reservoir tank, a mechanism for evacuating the reservoir tank, and a valve for selectively opening or closing the channel which connects the molding chamber and the reservoir tank.

The molding method of this invention is characterized by an extremely short molding tact. Therefore to get the most out of this merit, we cannot take too much time to reduce the pressure. To shorten the evacuating time, we employ a method of keeping the reservoir tank in a preset vacuum status until just before pressing starts, opening the valve to connect the reservoir tank and the molding chamber, and thus evacuating the molding chamber in a moment instead of evacuating the molding chamber by a vacuum pump. With this, we can carry out vacuum molding without extending the molding tact.

(10) The optical element molding method of any of (1) to (9), wherein the surface roughness (Ra) of the optical transfer surface in the cavity of the mold which is transferred to the surface of an optical element is 0.3 to 30 nm.

Figure 5:
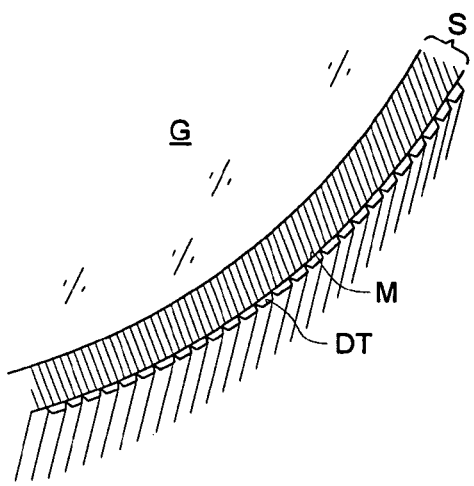
FIG. 5 is a magnified sectional view of the optical transfer surface of the mold when optical elements are molded by a droplet molding method.

In a conventional droplet molding method which puts a droplet of heated and molten glass into the lower mold and press-molds the glass droplet while cooling thereof, the glass droplet takes the surrounding gas (air or nitrogen gas) together into the lower mold when put into the lower mold. This gas pools there and reduces the transferability of the mold. To prevent this, the optical transfer surface of the lower mold is corroded to have a surface roughness (Ra) of 100 nm by a corrosive solution. Therefore, the shape of the optical surface cannot be transferred to the surface of the glass exactly when the glass droplet is pressed against the optical transfer surface of the lower mold by pressure. So, this conventional method sets the temperature of the optical transfer surface of the lower mold to an extremely low temperature to quickly form a skin layer on the glass droplet and transfers the corroded envelope optical surface of the lower mold. In other words, the conventional droplet molding method does not transfer the shape and the surface roughness of the optical transfer surface of the lower mold. It transfers the approximate envelope shape of the optical transfer surface and does not transfer the surface roughness. Since the high viscous skin layer of the glass surface in contact with the mold starts to cover the projections and dents of the corroded optical transfer surface of the lower mold and hardens with the dents and projections halftransferred gradually to the glass surface, the molded optical element has small gradual dents and projections on the optical surface. FIG. 5 is a magnified sectional view of the optical transfer surface of the mold for molding by the droplet molding method. The skin layer S of the glass material G extends so as to connect peaks on the corroded optical transfer surface M of the mold.

Figure 6:
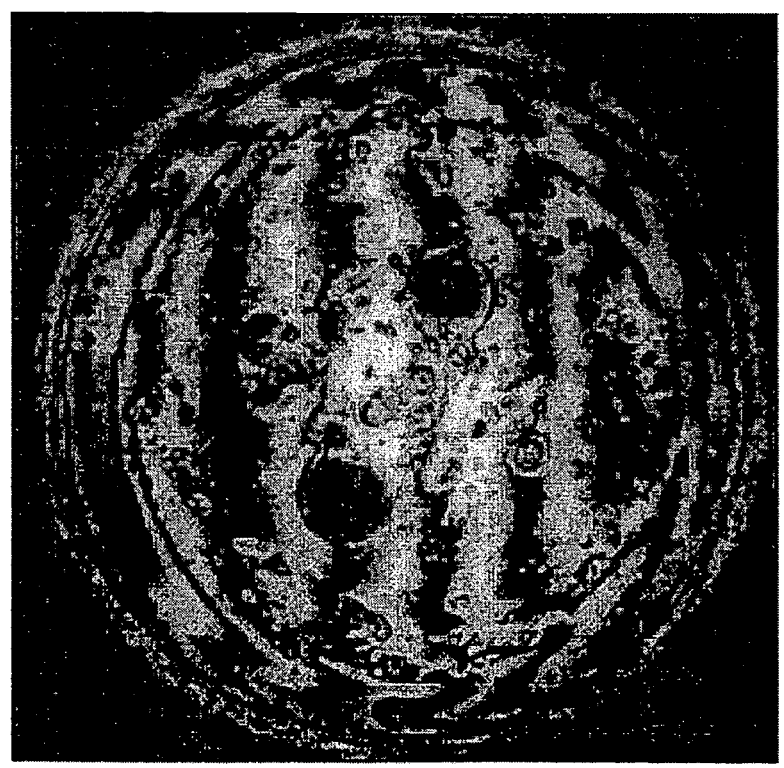
FIG. 6 shows an interference pattern observed on the surface of an optical element.

Therefore, since this conventional droplet molding method is originally intended to select a molding condition that does not transfer the corroded optical transfer surface of the mold instead of a molding condition that transfers the shape of an optical transfer surface of the lower mold exactly, the transferability of the molded optical element is not always good. The yield of optical elements by this molding method is low when high-precision optical elements are molded. Further, when observing the interference pattern of the optical surface of the molded optical element, we find that the interference pattern densities are minutely fluctuated by fine dents and projections on the optical surface and the interference pattern is low in contrast. FIG. 6 shows an interference pattern observed on the surface of an optical element molded by the droplet molding method. It is apparent that this interference pattern is less distinctive than the interference patterns of optical elements molded by the optical element molding method of this invention (see FIG. 7 and FIG. 8) and that the optical characteristics of the optical elements molded by the droplet molding method are inferior to those of optical elements molded by the optical element molding method of this invention. Such inferior optical elements are not available to optical pickup apparatus that record and reproduce high density information.

Contrarily, although the optical element molding method of this invention is the same as the conventional droplet molding method in that the heated and molten glass is molded while being cooled, the method of this invention presses the molten glass by force against the smooth optical transfer surface of the mold while the skin layer of the glass in contact with the mold is as thin as possible. The transferred surface of the molded optical element is smooth without any fine and gradual dents and projections and can transmit light without causing a light scattering. Naturally, when observed, the interference pattern of the transmission wave surface of the optical element is clear and high in contrast. Namely, this optical element has a high optical performance.

Further, this method does not require to make the optical transfer surface of the mold rough to eliminate gas pools. Without this process, the shape of the optical transfer surface has no dimensional error and the molding process can be simplified. Moreover, this method can assure molding of high-precision optical transfer surface shapes. Additionally, this method can select a molding condition to also transfer the roughness of the optical transfer surface of the mold. Accordingly, this method can mold high-precision optical elements of almost the same shape.

(11) The optical element molding method of any of (1) to (10), wherein the atmosphere, with which the cavity of the mold is in contact, is in cleanliness of Class 1000 or less.

Figure 3:
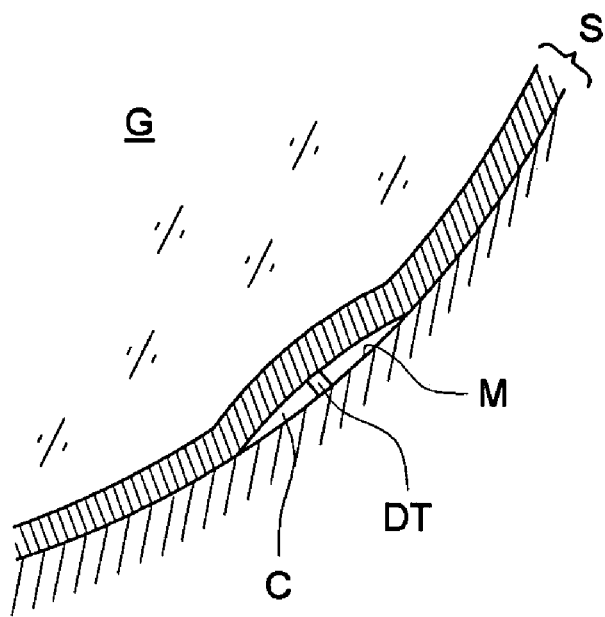
FIG. 3 is a magnified sectional view of the optical transfer surface of the mold when the molding method of this invention is carried out with some foreign particles on the optical transfer surface of the mold.

In the optical element molding method of this invention, a cooled and viscous skin layer exists between the glass and the mold surface although it is very thin. If there is a small dust particle on the glass surface or the optical transfer surface of the mold, the glass near the particle may have a circular dent away from the optical transfer surface of the mold. FIG. 3 is a magnified sectional view of the optical transfer surface of the mold when the molding method of this invention is carried out with a dust particle on the optical transfer surface M of the mold. On this figure, we can see large dent C near dust particle DT on skin layer S which is on the surface of glass material G.

Experimentally we inventors have found a little dust particle causes the skin layer to have a greater dent than the dust particle. For example, a dust particle of only a few microns in diameter will make a circular dent of several tens of micrometers in diameter. The process of making the optical transfer surface of the mold rough in the convention droplet molding method has an effect of eliminating the influence of dust particles. However, the molding method of this invention cannot use because a high-precision optical surface must be formed by molding. Particularly, if the molding method of this invention is carried out in a dusty environment, the optical transfer surface of the molded optical element has a lot of dents like craters and cannot be used as an optical surface at all. (See FIG. 6.)

Figure 4:
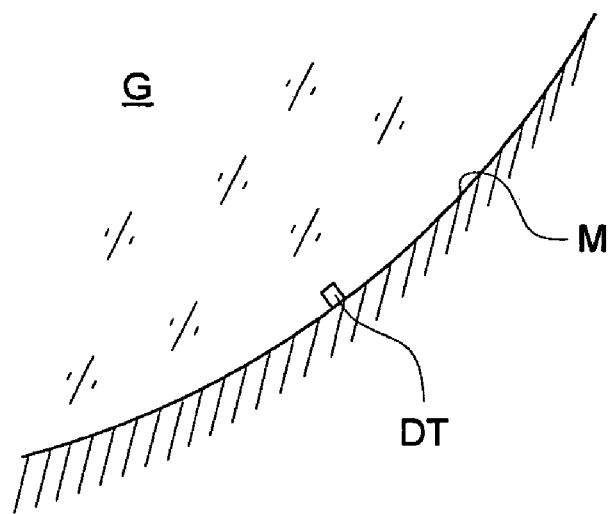
FIG. 4 is a magnified sectional view of the optical transfer surface of the mold when optical elements are molded by a reheating molding method.

These small dust particles can be ignored optically when they are taken into the glass material. For this purpose, we make both the glass material and the optical transfer surface of the mold hotter, press the glass material, and let the glass material slowly flow the glass, fill the dents, surround dust particles, and finally take them into the glass material. FIG. 4 is a magnified sectional view of the optical transfer surface of the mold when optical elements are molded by a reheating molding method. On this figure, we can see dust particle DT on optical transfer surface M of the mold is completely taken into glass material G.

The conventional reheating molding method which heats both the mold and the glass material together to a high temperature just uses this phenomenon to avoid a failure in transferring the optical surface by dust particles. However, under this molding condition, the glass material sticks to the mold surface, which is a significant problem of the reheating molding method. If the optical element molding method uses this phenomenon, its merit (high efficiency and high reliability molding without glass sticking to mold) will be lost.

Although it is possible to suppress generation of dents by dust particles by increasing the pressing pressure, the maximum pressing pressure which does not cause cracks on the optical surface in the latter part of the pressing process is 80 N/mm$^2$ and this effect is also limited.

We inventors have found that preventing invasion of dust particles into the molding system is the most effective and fundamental method to enjoy the merits (high precision, high efficiency, and high reliability) of the optical element molding method of this invention instead of changing the molding conditions. In other words, by keeping the surrounding molding gas below Cleanliness Class 1000 to prevent invasion of dust particles to the surface of molten glass and to the optical transfer surface of the mold, we have found we can mold high-precision optical elements which have excellent appearance and optical performance with suppressed generation of unwanted dents without reducing the production efficiency. This is an extremely effective means to accomplish the optical element molding method of this invention.

(12) The optical element molding method of any of (1) to (11), wherein an enclosure is provided to enclose a space which at least contains a molding chamber to shield the surrounding molding gas with which the cavity of the mold is in contact.

The molding gas of Cleanliness Class 1000 or less can be easily prepared by fully cleaning the parts around the molding chamber to shut out dust particles, covering the clean molding chamber, and connecting the chamber to the atmospheric air through an air filter. When the molding chamber is equipped with an aforesaid pressure-reducing mechanism (e.g. a reservoir tank, a vacuum pump, and valves), the molding chamber is highly air-tight originally. It is enough to provide only an air filter in the flow path of a molding gas (air or nitrogen gas) which is fed to break the vacuum status of the chamber. The molding gas of Cleanliness Class 1000 or less can be prepared easily.

(13) The optical element molding method of any of (1) to (12), wherein electric charges are neutralized around the molding chamber that shield the molding gas with which the cavity of the mold is in contact.

It is preferable to neutralize electric charges on the molding chamber and its vicinity by a neutralization blower or the like so that dust particles may not be attracted there by static electricity. This is effective to eliminate dents due to dust particles on the optical transfer surfaces of molds. The molding chamber and its vicinity include parts which constitute the molding chamber (such as a molding mechanism, a mold, and mold parts), gas with which the parts are in contact, a glass heating mechanism, and a glass transferring mechanism.

(14) The optical element molding method of any of (1) to (13), wherein the mold comprises one pair of mold members each of which has an optical transfer surface to be transferred to the optical surface of each optical element and the optical transfer surface of one of the mold members is made hotter by at least 5° C. than the optical transfer surface of the other mold member. This enables injection of a glass material towards the optical transfer surface of one of the mold members.

(15) The optical element molding method of (14), wherein the optical transfer surface of one of the molding members contains a concave surface whose depth is 0.4 or more (in ratio) of the effective diameter of the concave surface.

The optical element molding method of this invention is characterized by molding high-precision glass optical elements at high-speed, high-efficiency, and high-reliability by exactly transferring the shape and roughness of the optical transfer surface of the mold. In molding glass optical elements, some optical element shapes are hard to be molded at high precision and efficiency. One of such optical elements is an element having a convex optical surface whose depth (an axial radial distance in the center of the optical transfer surface) is much greater than the effective diameter of the convex optical surface. In other words, the optical transfer surface on the mold has an extremely deep concave surface. In this case, the molten glass must be pressed deep into the deep convex surface to be fully in contact with the whole optical surface. Therefore, the pressing force must be transmitted to the glass molding surface steadily. Particularly, this is very important when the shape and roughness of the optical transfer surface of a mold is exactly transferred to a glass element. The "effective diameter of an optical transfer surface" is defined as a diameter of a molded optical element corresponding to the effective diameter. The "depth of an optical transfer surface" is defined as an axial radial distance to the deepest point of the optical transfer surface from a plane including the effective diameter of the optical transfer surface. This is equal to the axial distance (see $\Delta 1$ and $\Delta 2$ in FIG. 13) to a peak on the optical transfer surface from a plane of the effective diameter of the optical transfer surface of the molded optical element.

Actually, we molded a deep concave surface by this molding process comprising the steps of heating a glass ball to be soft at a temperature of Tg by 1.80° C., putting the molten glass into a mold of Tg° C., and immediately pressing the mold. When the depth of the deep concave optical surface is 0.4 or more (in ratio) of the effective diameter, a shrink generates in the center (deepest point) of the concave surface under the above-explained molding conditions (glass material temperature and mold temperature range) only. In concrete terms, only the curvature of the center of the molded optical transfer surface is lower than the shape of the optical transfer surface of the mold. By observing the molded optical transfer surface (deep convex surface) in the shrink area, we found fine machining traces and flaws of the mold were transferred to the optical transfer surface and assumed that this shrink part of the glass was in contact with the optical transfer surface of the mold. However, we assumed that this shrink was made because the other part of the glass was deformed in the pressing process, the pressing force was not enough in this deepest part to press the glass against the optical transfer surface of the mold, and the glass went away from the optical transfer surface of the mold while the glass was cooled and shrunk. Generally, it is said that, in press-molding, it is important to keep on pressing the glass against the optical transfer surface of the mold until the glass temperature falls down to about the glass-transition temperature in order to improve the transferability.

To transfer such a deep concave optical transfer surface of the mold exactly and efficiently, the optical element molding method of this invention makes the optical transfer surface of one of the mold members hotter than the optical transfer surface of the other mold member. As the result, when the glass material touches both mold members at the beginning of pressing, the glass touching the non-deepest optical transfer surface of the mold member which is cooler increases its viscosity, has less deformation by pressing, becomes almost solid, and works to push the other part of glass against the deepest optical transfer surface. This facilitates transmission of the pressing force to the deepest concave optical transfer surface. As the deepest concave optical transfer surface is 5° C. or more hotter than the non-deepest concave optical transfer surface, the glass in the deepest concave side does not deform before it is pressed into the deepest concave optical transfer surface and efficiently pressed against the deepest concave optical transfer surface by the glass of the higher viscosity.

We actually formed a glass optical element having an aspheric optical transfer surface whose depth in the deepest concave part is 0.7 (in ratio) of the effective diameter by the optical element molding method of this invention. In details, we set the temperature of the deepest concave optical transfer surface of the mold member to TG+5° C. and the temperature of the non-deepest concave optical transfer surface of the other mold member to Tg−5° C., put the molten glass in the mold cavity, and started pressing immediately. The resulting molded optical element has a good optical transfer surface without any shrink to the deepest part of the optical surface. The mold shape error of the product is 50 nm PV or less. For reference, we prepared the same optical element under different temperature conditions (which sets the optical transfer surfaces of both mold members to the same temperature Tg). The resulting molded optical element has a low curvature only in the center of the optical transfer surface and the mold shape error of the product is 350 nm PV.

(16) The optical element molding method of any of (1) to (15), wherein an optical element with a flange is molded and a preset space is provided to allow the glass material to flow into the space to form the flange in the pressing process.

(17) The optical element molding method of any of (1) to (15), wherein an optical element with a flange is molded and a ring-shaped part to limit the flow of the glass material to form a flange has a thermal conductivity of 25 W/mK or less and a linear expansion coefficient smaller than that of the glass material.

(18) The optical element molding method of any of (1) to (15), wherein an optical element with a flange is molded and a ring-shaped part to limit the flow of the glass material to form a flange is heated in the pressing process.

(19) The optical element molding method of any of (1) to (18), wherein an optical element with a flange is molded, the diameter of the flange is up to 1.2 times of the maximum effective diameter of the optical transfer surface of the optical element, and the thickness of the flange is at least 0.2 times of the maximum effective diameter of the optical transfer surface.

The optical element molding method of this invention takes the steps of putting a heated and molten glass in a mold cooler than the glass, cooling thereof to harden while pressing thereof, and thus producing a high-precision glass optical element at high speed and stability. However, it is important to keep on pressing the glass against the optical transfer surface of the mold until the glass temperature falls down to about the glass-transition temperature in order to improve the transferability. This can effectively suppress the generation of shrink of the glass and deterioration of the optical transfer surface shape.

Usually, a glass optical element has a flange part which is a thin ledge having a surface perpendicular to the light axis around the element body (outer than the effective optical diameter) to fix the optical element along the light axis. The optical element molding methods are classified into two according to how this flange is handled in molding. One method is a filling molding method which forms the flange side (plane or curved surface in parallel with the light axis) and the optical transfer surface of the optical element simultaneously in the pressing process. The other method is a protrusion molding method which allows the glass to freely go out through the flange part in the pressing process and cuts off the unwanted protruded outer peripheral part of the flange in the later process.

The optical element molding method of this invention is basically of the filling molding type to transfer the shape and roughness of the optical transfer surface of the mold exactly at a high precision. However, the filling molding method is not so effective when the flange diameter is much greater than the effective diameter of the optical transfer surface as explained below.

When it is studied how the flange is press-molded by the mold members, usually the reference and opposite flange surfaces, which are perpendicular to the light axis, are press-molded by the mold members having opposite optical transfer surfaces. Therefore, a thin small flange is quickly cooled from both the reference and opposite sides by the cooler mold (which is cooler than the glass). These flange parts are quickly cooled and hardened also in the protrusion molding process. Further in the filling molding process, the flange side is also cooled by the ring-shaped part which is in contact with the glass. Namely, the flange part is cooled from three sides thereof by the mold and the ring-shaped part more quickly than the other glass part. Further, a flange of a greater diameter is cooled and hardened much more quickly because the flange surfaces in contact with the mold members are wider.

When the flange part is cooled and the viscosity of the flange glass increases quickly, the pressing force is blocked by the flange part and the press-stroke almost stops. In this status, the pressing force will not be transmitted to the optical transfer surface of the glass. Consequently, not to mention the glass shrink, the glass will not touch the optical transfer surface of the mold. Thus the mold transferability drops drastically.

Here, it is important to decelerate cooling and hardening of the heated and molten flange glass so that the flange glass may not be cooled and hardened much faster than the other glass part. With this, we can transmit the sufficient pressing force to the glass of the optical transfer surface and hold the glass to the glass-transition temperature (Tg) while the glass is pressed by the mol. Consequently, the mold transferability is not deteriorated. This effect can be obtained by the methods below. These methods can be done singly but will give greater effects when used in combination.

1) A protrusion molding method wherein a preset space is provided to allow the glass material to freely go out through the flange part to form a flange.

Figure 11:
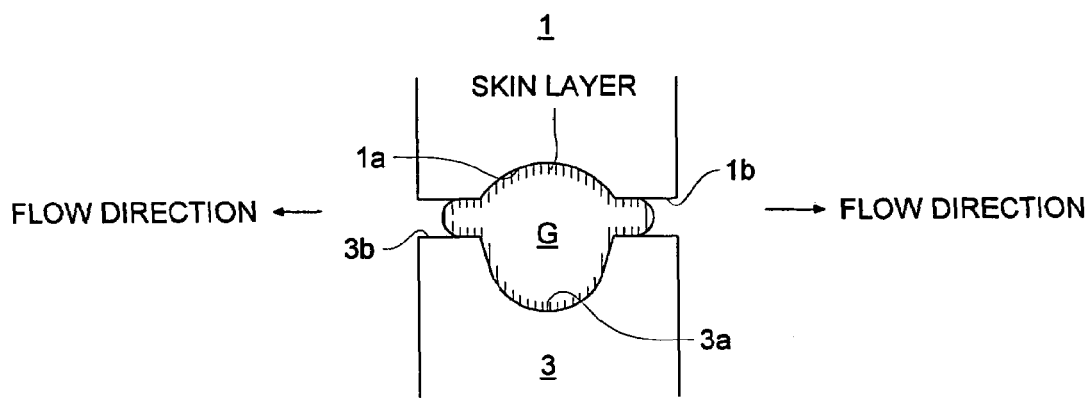
FIG. 11 shows a simplified sectional view of a mold which has a preset space to accept the flow of a glass material to form a flange part of the glass material.

In the protrusion molding method, as above-explained, the flange side can flow towards the outside of the mold without touching the mold members and its heat is insulated by the surrounding molding gas or vacuum. This molding method has an effect to make the cooling speed of the flange glass slower than the cooling speed of the filling molding method. FIG. 11 shows a simplified sectional view of a mold for protrusion molding which has a preset space to accept the flow of a glass material to form a flange part of the glass material. In FIG. 11, the upper mold member 1 has optical transfer surface 1a and circumferential surface 1b around it. Similarly, the lower mold member 3 has optical transfer surface 3a and circumferential surface 3b around it. In the molding process, the flange glass between the circumferential surfaces 1b and 3b does not touch anything and is not cooled quickly when moving radially outward.

2) A filling molding method wherein a ring-shaped part to form the flange side is made of a material whose thermal conductivity is low and the linear expansion coefficient is smaller than that of the glass material.

When touching the ring-shaped part in the pressing process, the radially-expanding glass is cooled more slowly because its thermal conductivity is lower than that of the other part materials. Therefore, cooling and solidification of the glass here are suppressed. Usually, cemented carbide material (70 W/mK as the thermal conductivity) and silicon carbide (90 W/mK as the thermal conductivity) are used as mold materials. To have a greater effect of insulation than these mold materials, the ring-shaped part is preferably made of a material whose thermal conductivity is about a fraction to one tenth of above thermal conductivities and more preferably 25 W/mK.

Figure 10:
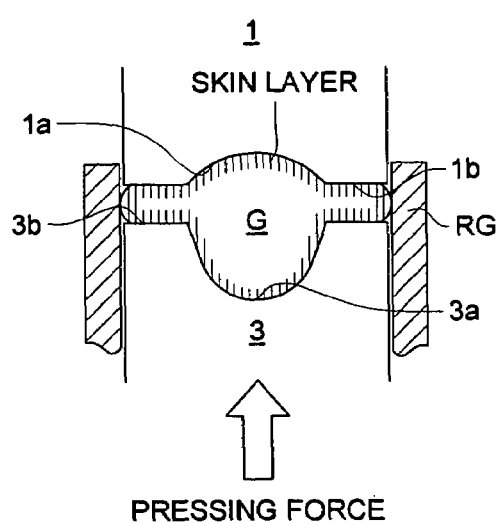
FIG. 10(*a*) and FIG. 10(*b*) respectively show sectional views of a ring-shaped mold part used together with a mold.
Figure 10:
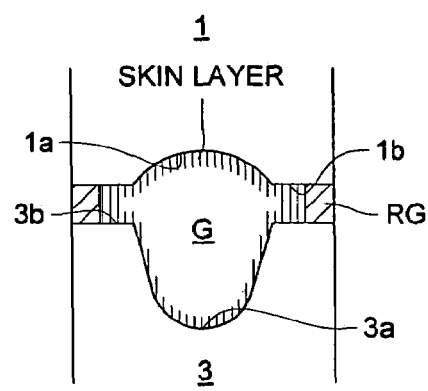

FIG. 10(a) and FIG. 10(b) respectively show sectional views of a ring-shaped part used together with a mold. FIG. 10(a) shows an example of ring-shaped part RG (25 W/mK or less as the thermal conductivity) which is fit to outer peripheries of upper mold 1 and lower mold 3. FIG. 10(b) shows an example of ring-shaped part RG (25 W/mK or less as the thermal conductivity) which is sandwiched between circumferential molding surfaces 1b and 3b of upper mold 1 and lower mold 3.

Here, the linear expansion coefficient of the ring-shaped part must be smaller than that of the glass material. If the expansion coefficient of the ring-shaped part is greater, the ring-shaped part works to throttle the flange of the molded optical element too much and may break the optical element or may not come off from the mold members. Therefore, the thermal conductivity of the ring-shaped part is preferably 25

W/mK or less and its linear expansion coefficient is preferably smaller than that of the glass material.

3) The molding method wherein the ring-shaped part is heated.

Figure 12:
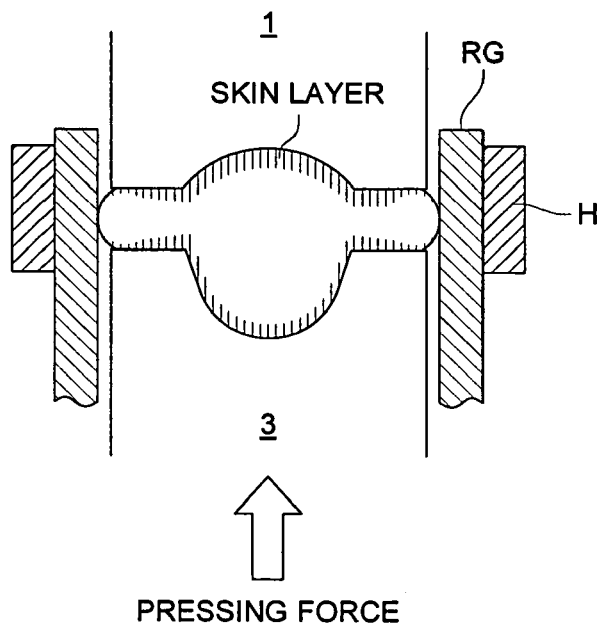
FIG. 12 shows the section of a ring-shaped mold part used together with a mold.

This heating increases the temperature of the circumferential molding surfaces (for the flange) and reduces the cooling speed of the flange glass. This method is effective to both protrusion and filling molding methods. In the protrusion molding method, the flange glass flows towards the outside when pressed but will not reach the ring-shaped part even the ring is provided. Contrarily, in the filling molding method, the expanding flange glass is blocked by the ring-shaped part and the flange side formed by the ring-shaped part. In this protrusion molding method which allows the glass to directly touch the ring-shaped part, the cooling speed of the flange glass can be reduced. The temperature of the ring-shaped part is preferably between a temperature which is a little (5 to 20° C.) higher than mold temperature and a temperature which stops solidification of the glass material. FIG. 12 shows the section of a ring-shaped mold part used together with a mold. Ring-shaped part RG is enclosed with heater H. Ring-shaped part RG can be sandwiched between circumferential molding surfaces 1b and 3b of upper mold 1 and lower mold 3 as shown in FIG. 10(b).

4) The molding method wherein the flange of the molded optical element has a smaller diameter so as not to exceed the greater effective diameter of the optical transfer surface too much.

Figure 13:
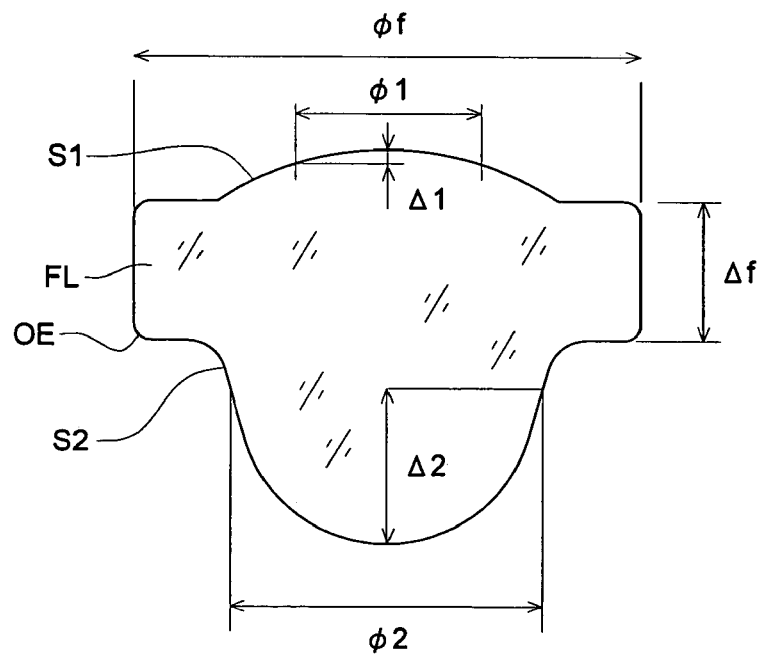
FIG. 13 shows a sectional view of an example of a molded optical element.

This size reduction can reduce the front and opposite surface areas of the flange and the areas in contact with the mold. When the flange is made thicker, the flange has a greater heat capacity and can easily receive heat from the element body which has a great heat capacity. This structure can reduce the rate of cooling and solidifying the flange glass in the pressing process. As the result, this structure improves the mold transferability. FIG. 13 shows a sectional view of an example of a molded optical element. Referring to FIG. 13, optical element OE has optical surfaces S1 and S2 and flange FL. The peripheral diameter and the thickness of flange FL are respectively φf and Δf. Optical surfaces S1 and S2 respectively have effective diameters φ1 and φ2. The "effective diameter of an optical surface" means an area of an optical element which has an optical effect such as transmitting, reflecting, and diffracting light, that is, an area which contributes to the original purpose of the optical element.

Next will be explained the diameter and thickness of the flange. We inventors prepared biconvex optical elements which has the effective diameter (maximum effective diameter) of 2.4 mm in the greater optical surface and a flange of 0.4 mm thick by the optical element molding method of this invention while changing the diameter of the flange. We found that, in some cases, the pre-stroke was stopped half-way and the pressing force was blocked by the solidified flange glass when the flange diameter was 3.6 mm to 3.1 mm. When the flange diameter was 3.0 mm or less, the pre-stroke was fulfilled. Judging from the stability of the optical element, the flange diameter should preferably be about 2.9 mm on the safe side. It is assumed this flange diameter value is dependent upon the size and shape of the glass optical element to be molded. From the above however, we assume the cooling and solidifying rate of the flange is not so big if the flange diameter is about 1.2 times the effective diameter of the optical surface. Similarly, it is assumed this flange thickness value (0.4 mm in the above example) is dependent upon the size and shape of the glass optical element to be molded. From the above, we assume that the flange thickness should be about 0.2 or more times the effective diameter of the optical surface.

In this way, by optimizing the dimensions of the flange of a glass optical element, the optical element molding method of this invention can reduce the cooling speed of the flange glass in the press-molding process and easily mold a high-precision glass optical element. The optimization of flange dimensions is more preferable in the filling molding method because the centering and edging of the outer periphery of the flange is not required.

(20) An optical element formed by any of the optical element molding methods of (1) to (19), wherein zone structures around a light axis are formed on the optical surface of the optical element.

(21) The optical element of (20), wherein the zone structures can give optical path differences.

(22) The optical element of (21), wherein the zone structure is a blaze type diffraction structure whose section in optical axis direction shows a saw-teeth shape.

(23) The optical element of (21), wherein the zone structure is a diffraction structure whose section in optical axis direction shows a stepwise shape.

(24) The optical element of any of (21) to (23), wherein the zone structures has a function of correcting a change in aberration of the optical element due to change in wavelength of a light source which sends light to the optical element.

(25) The optical element of any of (21) to (24), wherein the zone structures has a function of correcting a change in aberration of the optical element due to change in temperature of the optical element.

(26) An optical element formed by any of the optical element molding methods of (1) to (19), wherein the transfer surface of a mold to form the optical element has dents or projections to form corresponding projections or dents on the optical surface of the optical element.

(27). The optical element of (26), wherein the projections or dents on the optical surface of the optical element form fine structures in the equivalent refraction index region.

(28) The optical element of (26) or (27), wherein the projections or dents on the optical surface of the optical element form fine structures which generate an antireflection effect.

(29) The optical element of any of (26) to (28), wherein the projections or dents on the optical surface of the optical element form fine structures which generate a structural double refraction.

(30) The optical element of any of (26) to (29), wherein the projections or dents on the optical surface of the optical element form fine structures in a resonance region.

(31) The optical element of any of (26) to (30), wherein the projections or dents exist on part of the optical surface of the optical element and the mold has the corresponding dents or projections on part of the transfer surface to be transferred to the optical element.

(32) The optical element of any of (26) to (31), wherein the projections or dents which form a plurality of shapes or layout patterns exist on part of the optical surface of the optical element and the mold has the corresponding dents or projections on part of the transfer surface to be transferred to the optical element.

Figure 14:
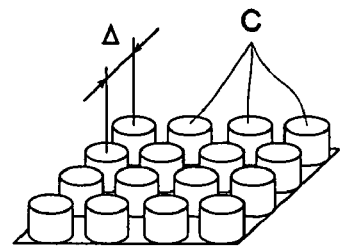
FIG. 14(*a*) to FIG. 14(*c*) respectively show perspective views of sample optical surfaces of optical elements.
Figure 14:
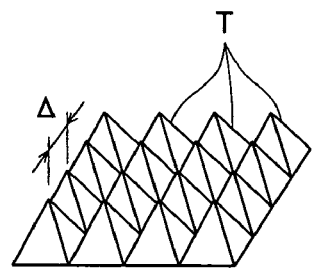
Figure 14:
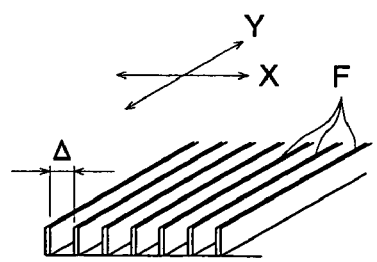
Figure 14:
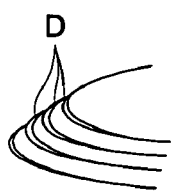

FIG. 14(a) to 14(d) show magnified perspective views of sample optical surfaces of optical elements. FIG. 14(a) shows a matrix of fine cylinders as an example of projections (fine structures in the equivalent refraction index region). For example, when this optical element is used as an object lens for a DVD recording/reproduction pickup device, the lens passes light of about 650 nm. When the fine cylinders C are disposed at an interval (Δ) of 160 nm, this lens can pass all incident light without reflecting part of the light. Therefore, this can provide an object lens of extremely high light transmissivity.

FIG. 14(b) shows a matrix of fine triangular pyramids T which are disposed at interval Δ as an example of projections. These structures can provide an effect similar to those of FIG. 14(a). The interval Δ of 0.1 to 0.2 μm or less is preferable as it can suppress light scattering. FIG. 14(c) shows a set of micro fins F which are disposed at interval Δ on the optical surface as an example of projections. Each fin is longer than the wavelength of light passing through the optical surface (650 nm or more in the above example). The lens of this configuration allows light having its vibrating plane along the fins to pass but blocks light whose vibrating plane is perpendicular to fins F. In other words, this lens has a polarization effect. FIG. 14(d) shows a sample zone structures around a light axis on the optical surface of a lens. It is a blaze diffraction zone D whose axial section shows the saw-tooth shape. The color aberration and temperature correction, which are the shape-dependent effects of the diffraction zone D, are disclosed by Japanese Non-Examined Patent Publication 2001-195769. So the zone structures will not be explained here. The other structures can be also molded. They are, for example, NPS (structures which has a function to give phase differences) and DOE (structures which has a function to diffract selected wavelengths). Although FIG. 14(a) to FIG. 14(c) respectively show examples of projections for convenience, it is possible to make their bottom surface curved (to be spherical or aspheric) and put the projections on the curved surface.

This specification handles optical elements such as lenses, prisms, diffraction grating optical parts (diffraction lenses, diffraction prisms, diffraction plates), optical filters (space low-pass filters, wavelength band-pass filters, wavelength low-pass filters, and wavelength high-pass filters), polarization filters (analyzers, polarizers, and polarization splitting prism), and phase filters (phase plate, hologram, etc.). However, the optical elements of this invention are not limited to these.

The diffraction structures (diffraction zone) used in this specification means a diffraction surface which forms a relieve of concentric zone around a light axis on the optical surface of an optical element (e.g. lens) to collect or diffuse light fluxes. For example, the zones are like saw teeth when they are viewed from a plane containing the light axis. The diffraction zone is also called diffraction grooves.

EMBODIMENT OF THE INVENTION

Figure 9:
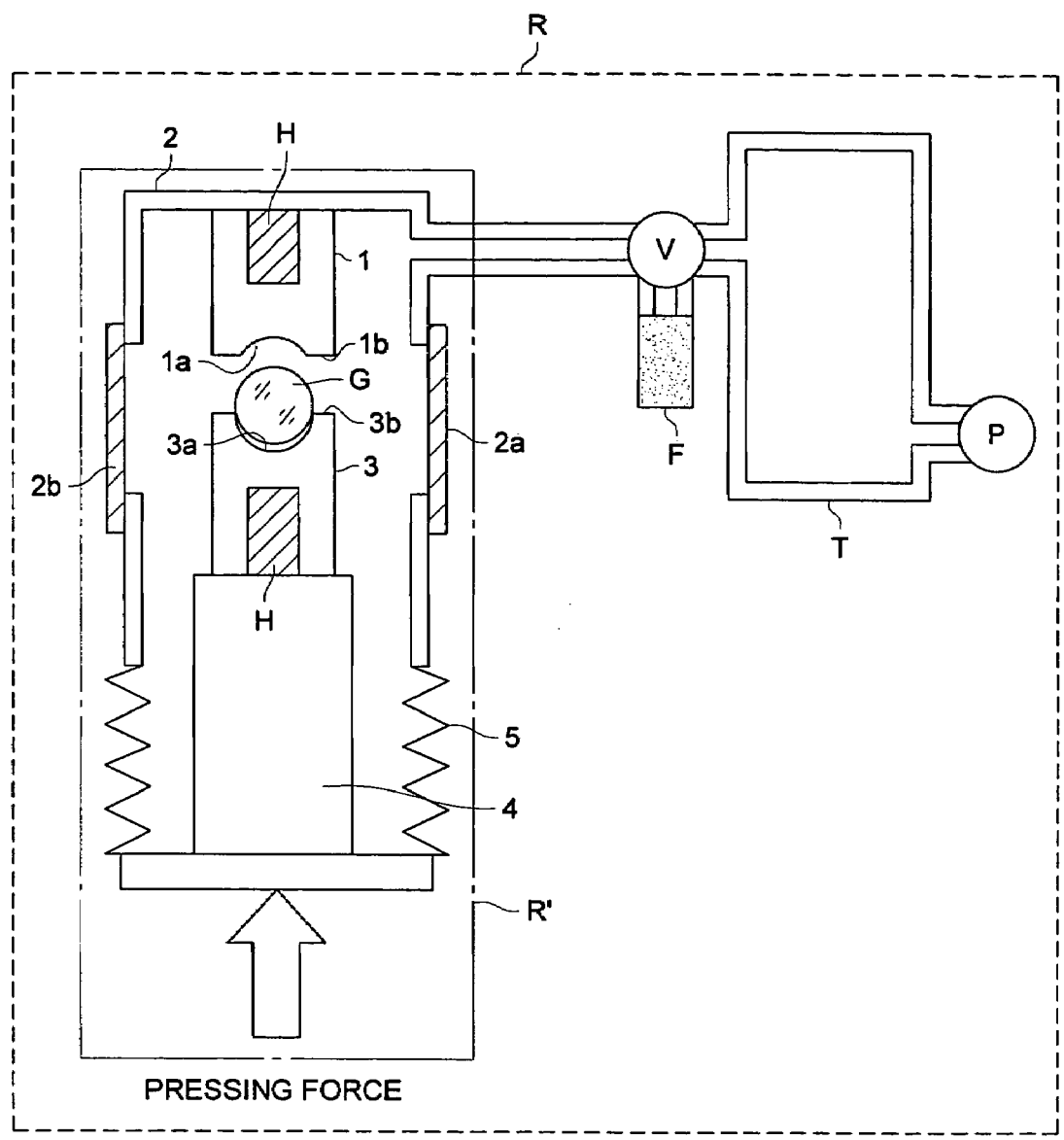
FIG. 9 shows a simplified sectional view of a molding machine which carries out the optical element molding method of this invention.

The preferred embodiments of this invention will be described in detail with reference to the accompanying drawings. FIG. 9 shows a simplified sectional view of a molding machine which carries out the optical element molding method of this invention. Upper mold 1 which contains heater H has optical transfer surface 1a and circumferential surface 1b on the bottom and is mounted on the upper part of the cabinet 2. Similarly, lower mold 3 which contains heater H has optical transfer surface 3a and circumferential surface 3b on the top and is mounted opposite to upper mold 1. The surface roughness values (Ra) of optical transfer surfaces 1a and 3a are respectively 0.3 to 30 nm.

Lower mold 3 is mounted on driving part 4 and supported to move up towards upper mold 1. Driving part 4 is connected to cabinet 2 with bellows 5. Upper mold 1 and lower mold 3 forms a mold together. The surface temperatures of molds 1 and 3 are measured by thermometers (not shown in the drawings). It is possible to provide a ring-shaped part around molds 1 and 3.

Cabinet 2 is equipped with entrance door 2a and exit door 2b which can be opened and closed. The inside of cabinet 2 is a molding chamber. Cabinet 2 is connected to reservoir tank T by means of piping C and valve V. Reservoir tank T is vacuumized by vacuum pump P. Valve V is a 3-way valve. The first valve position communicates the inside of cabinet 2 with reservoir tank T. The second valve position communicates the inside of cabinet 2 with the atmosphere through 0.5-μm filter F. It is possible to put the whole molding machine in clean room R enclosed with glass frames. However, in this case, there are so many dust sources in the clean room and dust removing effect is lowered. To clean the molding machine effectively, at least cabinet 2 (and a conveying unit which is not shown in the drawing) should be enclosed with cover R'. With this, Cleanliness Class 1000 or less can be easily made inside the cover. Additionally, the molding machine and the vicinity should preferably be electrically neutralized.

Next will be explained a method of forming an optical element by a molding machine which is an embodiment of this invention. We prepared 100-liter reservoir tank T, evacuated the tank by vacuum pump P to always keep the tank pressure at about 0.01 atmosphere, and heated glass material G outside the molding chamber. This example uses phosphoric glass material G of glass-transition temperature (Tg)=390° C. In this case, we can heat and deliver glass material simultaneously by a conveying means disclosed in Japanese Non-Examined Patent Publication 2004-51291. Simultaneously we heat upper mold 1 and lower mold 3 by heater H.

We heated glass material G on the delivering unit (not shown in the drawing) to 700° C. which is equivalent to Tg×1.79° C. (where Tg is a glass-transition temperature of the glass material) at which the glass material became softened. (Glass heating process) We heated upper mold 1 by heater H until its surface temperature reaches Tg+20° C. (or 410° C.) and lower mold 3 by heater H until its surface temperature reaches Tg° C. or 390° C. (Mold heating process). The glass material and the molds (1 and 3) can select any temperature in the temperature range specified by claims.

When the glass material and the molds respectively reach the specified temperatures, we opened entrance door 2a of cabinet 2 and put glass material into optical transfer surface (cavity) 3a of lower mold 3 from the delivering unit (not shown in the drawing).

Immediately after putting the glass material in the mold, we retracted the delivering unit from the molding chamber, closed entrance door 2a, and set valve V to the first position. At this moment, the gas in the molding chamber in cabinet 2 is sucked into reservoir tank in an instant and the molding chamber reaches the certain degree of vacuum. Experimentally, we found that the pressure of the molding chamber was reduced to about 0.05 atmospheric pressure in about 0.2 second and was retained continuously.

In this status, we drove driving section 4 to move up lower mold 3 to upper mold 1 to press (Pressing process). It took 0.5 second between a time instant at which glass material was put in the mold cavity and a time instant at which pressing started. A sample pressing process comprises the steps of applying a pressure of 400 N (57.5 N/mm$^2$) to glass material G at a dash within 0.5 second after starting pressing to press molten glass material G against optical transfer surfaces 1a and 3a at once, applying a pressure of 250 N (32.5 N/mm$^2$) in one second after starting pressing, 200 N (26 N/mm$^2$) in two seconds after starting pressing, and 150 N (21 N/mm$^2$) in three seconds after starting pressing, and keeping the pressure up to 10 seconds after starting pressing. Any pressing force and time values can be selected from the specified ranges in the embodiments.

Then we drove driving section 4 to move down lower mold 3 from upper mold 1 to depress and set valve V to the second position to enter the outside air into cabinet 2 through filter F. Experimentally we found that it took about 1 second before entering the outside air. Next, we opened exit door 2b and took out the molded optical element by the delivering unit (not shown in the drawing). With this, one molding cycle is complete.

We inventors obtained molded glass optical elements by actually molding under the above pressing force and time conditions. These optical elements are object lenses for NA0.85 next generation optical disks.

The physical properties of the optical elements are as follows:

Peripheral diameter: 3.0 mm

Area projected along the pressing axis: 7.07 mm$^2$

The effective diameter of the optical transfer surface of the upper mold is smaller than that of the lower mold.

The maximum normal angle of the optical transfer surface of the upper mold is about 10 degrees and that of the optical transfer surface of the upper mold is about 66 degrees (very deep).

The effective diameter (maximum effective diameter) of this surface is 2.5 mm and the ratio of the depth between the center of the optical surface and the effective diameter to the effective diameter is 0.44.

The (outer) flange diameter is 3.0 mm and the ratio of the flange diameter to the effective diameter 2.5 mm) is 1.2.

The flange thickness is 0.57 mm and the ratio of the flange thickness to the effective diameter 2.5 mm) is about 0.23.

In summary, this optical element is made to reduce the flange volume and the glass solidification speed.

We polished the optical transfer surfaces of the mold to have a surface roughness (Ra) of 2 nm and a shape precision of 50 mm PV and coated the mold surfaces with a protective coat to prevent oxidation of the cemented carbide material. For a ring-shaped part to form a flange side, we used silicon nitride which has a linear expansion coefficient (35×10$^{-7}$) smaller than that (130×10$^{-7}$) of glass material and a thermal conductivity (22 W/mK) much smaller than that (70 W/mK) of cemented carbide mold material. This assures heat insulation of the flange section and reduces the solidification speed of the flange glass.

Figure 7:
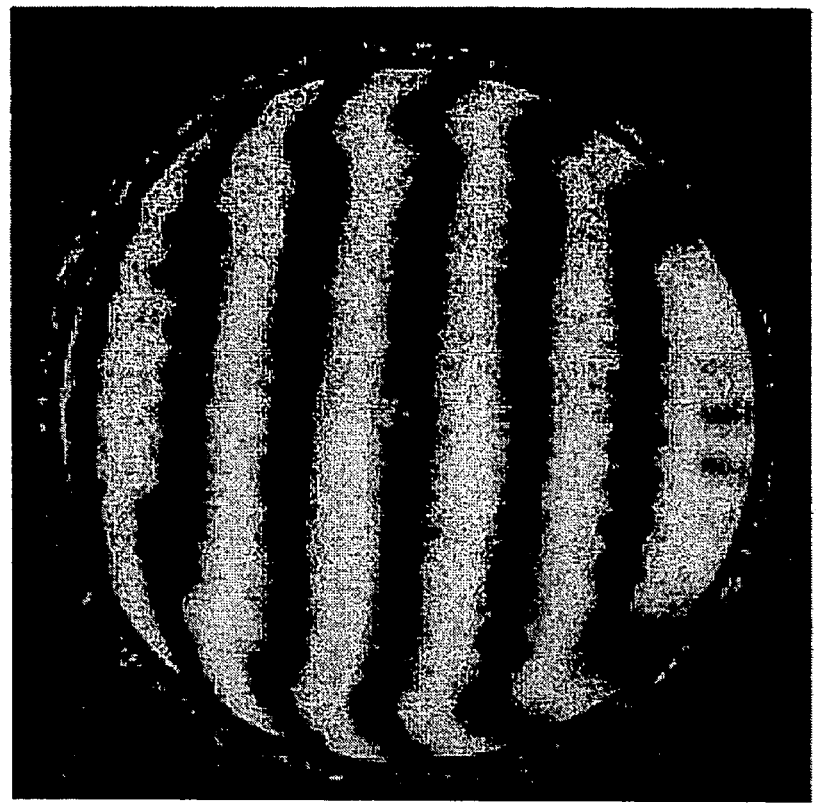
FIG. 7 shows an interference pattern observed on the surface of an optical element.

We measured the wavefront aberration of the molded optical element by a light wavelength of 407.5 nm. FIG. 7 shows an interference pattern observed on the surface of the optical element. The whole wavefront aberration is 38.4 mλrms containing a spherical aberration component (32.5 mλ), a coma aberration component (1.7 mλ), and an astgmatism component (10.5 mλ). The curved interference pattern on the circumferential part is caused by a machining error of the mold. No dent due to dust particles is found on the optical surface of the molded optical element. We conclude that this molding method can exactly transfer the shape and surface roughness of a mold to an optical element quickly.

Figure 8:
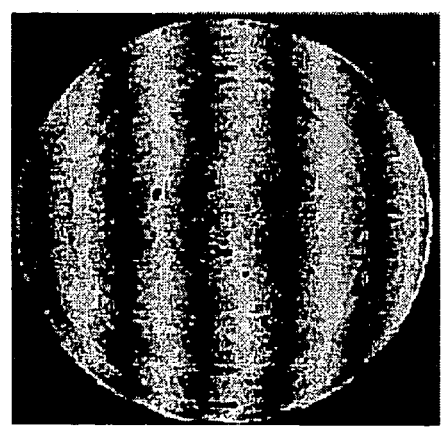
FIG. 8 shows an interference pattern observed on the surface of an optical element.

For reference, we inventors obtained molded glass optical elements by the above molding in a gas condition of Cleanliness Class 100,000 (with which the mold cavity was in contact). We observed the wavefront aberration of the molded optical element by interface of a light wavelength of 407.5 nm. FIG. 8 shows an interference pattern observed on the surface of the optical element. In comparison of FIG. 8 to FIG. 7, the optical surface of the optical element had a lot of dents due to dust particles.

Table 1 lists press-molding conditions (temperatures of glass material put in the mold and temperatures of the optical surface of the mold in the press-molding process) and the evaluation of the obtained optical elements.

TABLE 1

| Glass temp. (° C.) | Mold temp. (° C.) | Element quality | Mold releasing ability | Surface transferability |
|---|---|---|---|---|
| Tg × 1.57 | Tg − 68 | G | G | B |
| Tg × 1.57 | Tg − 30 | G | G | B |
| Tg × 1.57 | Tg | G | F | B |
| Tg × 1.57 | Tg + 47 | G | B | B |
| Tg × 1.61 | Tg − 73 | G | G | B |
| Tg × 1.61 | Tg − 68 | G | G | F |
| Tg × 1.61 | Tg − 30 | G | G | G |
| Tg × 1.61 | Tg | G | F | G |
| Tg × 1.61 | Tg + 47 | G | F | G |
| Tg × 1.61 | Tg + 55 | G | B | B |
| Tg × 1.70 | Tg − 73 | G | G | B |
| Tg × 1.70 | Tg − 68 | G | G | G |
| Tg × 1.70 | Tg − 30 | G | E | G |
| Tg × 1.70 | Tg | G | E | G |
| Tg × 1.70 | Tg + 47 | G | F | G |
| Tg × 1.70 | Tg + 55 | G | B | F |
| Tg × 1.85 | Tg − 73 | G | G | B |
| Tg × 1.85 | Tg − 68 | G | G | G |
| Tg × 1.85 | Tg − 30 | G | E | G |
| Tg × 1.85 | Tg | G | E | G |
| Tg × 1.85 | Tg + 47 | G | G | G |
| Tg × 1.85 | Tg + 55 | G | B | F |
| Tg × 1.88 | Tg − 68 | B | G | F |
| Tg × 1.88 | Tg | B | B | F |
| Tg × 1.88 | Tg + 47 | B | B | F |

"Element quality" in Table 1 means the result of visual inspection of the appearance of each molded optical element. The result is indicated by "G" or "B." "G" (short for "Good") is given unless any glass whitening, crystalline dust, and air bubble are detected on the optical element. "B" (short for "Bad") is given if such phenomenon are detected.

"Mold releasing ability" means whether the old optical element is easily released from the optical transfer surface of the mold. In the press-molding process, the adhesion of an optical element to the mold surface is classified into four below.

(1) Fusing "B" (short for Bad) (In this status, the optical element is fusion-bonded to the optical transfer surface of the mold and cannot be separated from it anyhow.)

(2) Heavy sticking "F" (short for Fair) (In this status, the optical element is bonded to the optical transfer surface of the mold but can be forcibly separated from the mold surface by a vacuum-pickup or the like. In this case, small part of the glass may remain bonded to the mold surface.)

(3) Weak sticking "G" (short for Good) (In this status, the optical element remains in the mold immediately when the mold members are opened but falls by gravitation within 10 seconds after that. In this case, no part of the glass remains bonded to the mold surface.)

(4) No sticking "E" (short for Excellent) (In this status, the optical element falls by gravitation immediately when the mold members are opened.)

When a molded optical element is fusion-bonded to the mold surface ("B" in Table 1), we must demount the mold and wash away the remaining optical element from the mold. In the other adhesion state ("F," "G," and "E"), we can continue press-molding without maintaining (or cleaning) the mold.

"Surface transferability" means whether the optical surface of the mold is transferred exactly to the surface of the optical element. We used a form tester such as "Form Talysurf" (by Taylor Hobson K. K.) to measure the dimensional accuracy of the optical surface of each molded optical element. In Table 1, "G" is given when the optical surface error is 100 nm PV or less. "F" is given when the optical surface error is between 100 nm PV (not included) and 300 nm PV. "B" is given when the optical surface error is more than 300 nm PV or less. The optical surface error should be 100 nm PV or less to mold high-precision optical elements.

In conclusion, when the temperature of the glass material to be put in the mold is in the range of Tg by 1.60 to 1.85° C. (where Tg is the glass-transition temperature of the material), and the temperature of the mold is in the range of Tg+50 to Tg−70° C. when the glass material is put in the mold, the molded optical elements obtained "G" or "E" in evaluation of "Element quality," "Mold releasing ability," and "Surface transferability."

Figure 2:
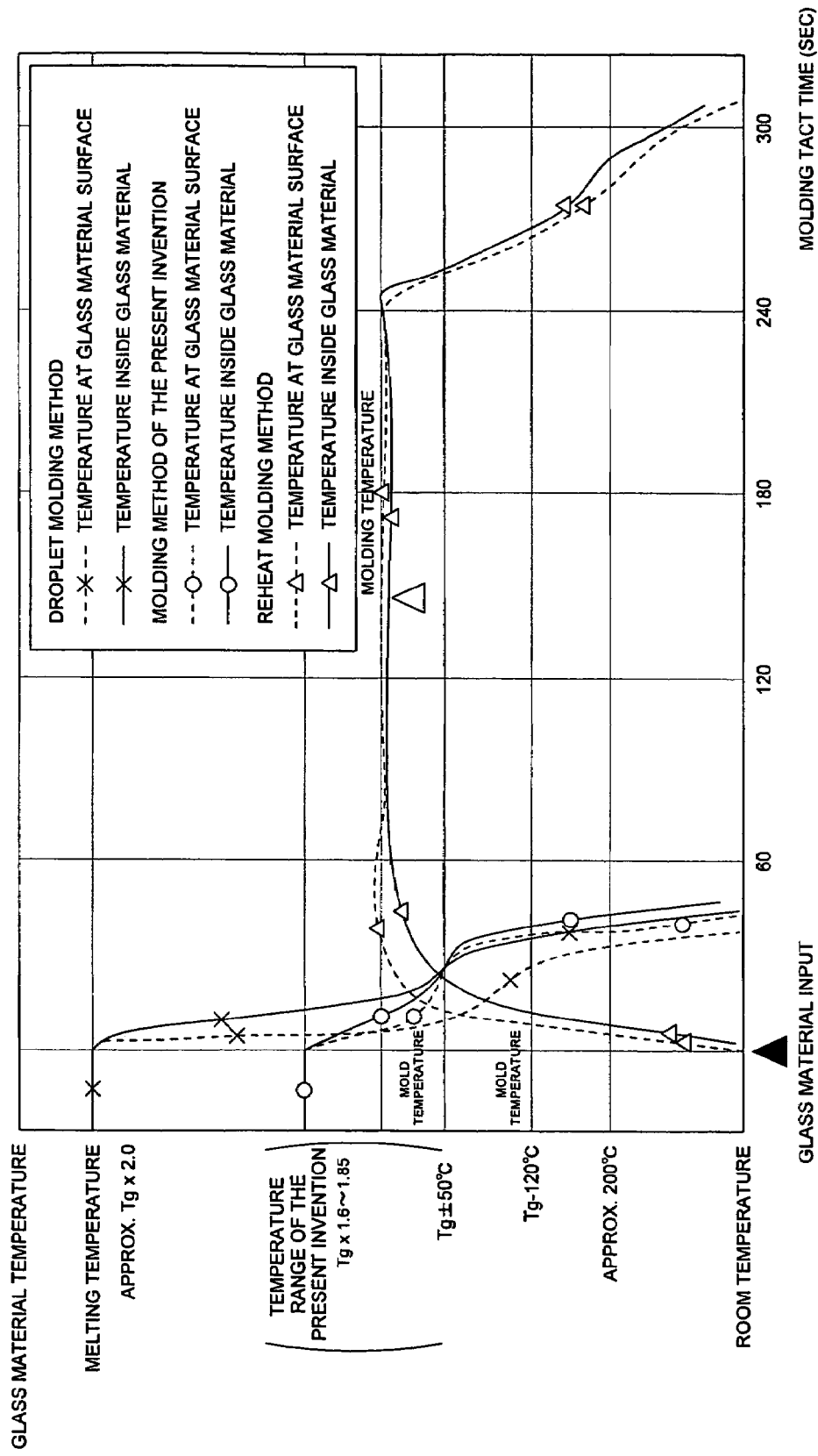
FIG. 2 is a graph showing the relationships of glass material temperatures (as the vertical axis) and molding tacts (as the horizontal axis) of the molding methods of this invention and conventional molding methods.

Further, when the temperature of the glass material to be put in the mold is in the range of Tg by 1.70 to 1.85° C. (where Tg is the glass-transition temperature of the material), and the temperature of the optical transfer surface of the mold is in the range of Tg to Tg−30° C. when the glass material is put in the mold, the molded optical elements obtained "E" (Excellent) in evaluation of "Mold releasing ability." FIG. 1 shows the result of evaluation of "Mold releasing ability" as a graph of the relationship between the molding temperature (as the vertical axis) and the glass material temperature (as the horizontal axis). FIG. 2 graphically shows the comparison of the actual molding tact time of the molding method of this invention by the molding tact time of the other molding methods.

EFFECTS OF THE INVENTION

This invention can provide an optical element molding method that can shorten the molding tact and produce high precision glass optical elements at high reliability and yield and also provide optical elements.

While the preferred embodiments of the present invention have been described using specific terms, such description is for illustrative purposes only, and it is to be understood that changes and variations may be made without departing from the spirit or scope of the appended claims.

The invention claimed is:

1. A method for molding an optical element by pressing a glass material in a mold, the method comprising:
   heating to soften the glass material outside a cavity of the mold;
   heating the mold;
   putting the heated glass material into the heated mold; and
   pressing the glass material with the mold after putting the glass material into a cavity of the mold,
   wherein, when the glass material is put into the mold a temperature of the glass material is in a range of (Tg×1.60)° C. to (Tg×1.85)° C., and a temperature at an optical transfer surface of the mold is in a range of (Tg+50)° C. to (Tg−70)° C., where Tg is the glass-transition temperature of the material.

2. The method for molding an optical element of claim 1, wherein the pressing starts within 3 seconds after the heated and softened glass material is put into the cavity of the mold.

3. The method for molding an optical element of claim 1, wherein the mold comprises one pair of mold members to press the glass material, and a time period between a start of the pressing and an arrival to a preset stroke of the pressing is 15 seconds or less.

4. The method for molding an optical element of claim 1, wherein a pressing force is controlled so that a mean pressing force of the mold becomes 80 N/mm$^2$ or less at a time of at least 3 seconds after the pressing starts.

5. The method for molding an optical element of claim 4, wherein the pressing force is controlled so that the mean pressing force of the mold becomes 10 N/mm$^2$ or more at an end of the pressing process.

6. The method for molding an optical element of claim 1, wherein a pressing force is controlled so that a mean pressing force of the mold becomes temporarily within a range of 50 to 250 N/mm$^2$ in a time period of 3 seconds after the pressing starts.

7. The method for molding an optical element of claim 1, wherein a pressing force is controlled so that a mean pressing force of the mold becomes temporarily to the maximum pressing force in the period of 3 seconds after the pressing starts, and then reduces to lower pressures continuously or intermittently along with a progress of the pressing process.

8. The method for molding an optical element of claim 1, wherein a molding chamber is provided to shield an atmosphere with which the glass material and the cavity of the mold contact, and a pressure in the molding chamber is reduced below an atmospheric pressure during the pressing process.

9. The method for molding an optical element of claim 8, further comprising the process of reducing the pressure in the molding chamber below the atmospheric pressure before the pressing process, by using a reservoir tank, a mechanism for evacuating the reservoir tank, and a valve for selectively opening or closing a channel which connects the molding chamber and the reservoir tank.

10. The method for molding an optical element of claim 1, wherein the surface roughness (Ra) of the optical transfer surface, which is transferred to the surface of an optical element, in the cavity of the mold is within a range of 0.3 to 30 nm.

11. The method for molding an optical element of claim 1, wherein an atmosphere, with which the cavity of the mold contacts, is in cleanliness level of Class 1000 or less.

12. The method for molding an optical element of claim 8, wherein an enclosure is provided to enclose a space which at least contains the molding chamber.

13. The method for molding an optical element of claim 8, wherein electric charges around the molding chamber are neutralized.

14. The method for molding an optical element of claim 1, wherein the mold comprises a pair of a first mold member and a second mold member, each of the first mold member and the second mold member having an optical transfer surface to be transferred to the optical surface of the optical element, and a temperature of the optical transfer surface of the first mold member is made higher by at least 5° C. than the temperature of the optical transfer surface of the second mold member.

15. The method for molding an optical element of claim 14, wherein the optical transfer surface of the first mold member comprises a concave surface whose ratio of a depth to an effective diameter is 0.4 or more.

16. The method for molding an optical element of claim 1, wherein the optical element to be molded comprises a flange, and a preset space is provided to allow the glass material to flow into the preset space to form the flange in the pressing process.

17. The method for molding an optical element of claim 1, wherein the optical element to be molded comprises a flange, and a ring-shaped part to limit the flow of the glass material to form the flange is provided, the ring-shaped part having a thermal conductivity of 25 W/mK or less and a linear expansion coefficient smaller than that of the glass material.

18. The method for molding an optical element of claim 1, wherein the optical element to be molded comprises a flange, and a ring-shaped part to limit the flow of the glass material to form the flange is provided, and the ring-shaped part is heated in the pressing process.

19. The method for molding an optical element of claim 1, wherein the optical element to be molded comprises a flange, a diameter of the flange is not greater than 1.2 times of a maximum effective diameter of an optical surface of the optical element, and a thickness of the flange is not smaller than 0.2 times of the maximum effective diameter of the optical surface.

* * * * *